United States Patent
Liu et al.

(10) Patent No.: US 7,378,990 B2
(45) Date of Patent: May 27, 2008

(54) LASER LOCUS BALL APPARATUS FOR A WIRELESS KEYBOARD

(75) Inventors: Yung-Lung Liu, Taya Hsiang (TW); Yuan-I Yu, Taya Hsiang (TW)

(73) Assignee: Sunrex Technology Corp., Taichung Hsien (TW)

( * ) Notice: Subject to any disclaimer, the term of this patent is extended or adjusted under 35 U.S.C. 154(b) by 172 days.

(21) Appl. No.: 11/379,358

(22) Filed: Apr. 19, 2006

(65) Prior Publication Data

US 2007/0257820 A1 Nov. 8, 2007

(51) Int. Cl.
*G06F 3/033* (2006.01)

(52) U.S. Cl. .................. 341/20; 345/167; 345/164; 341/31; 250/221

(58) Field of Classification Search .......... 341/20, 341/31; 345/167, 164, 163, 166; 250/221
See application file for complete search history.

(56) References Cited

U.S. PATENT DOCUMENTS

| 6,686,584 | B2 * | 2/2004 | Nachtigall et al. ........ 250/221 |
| 7,098,895 | B2 * | 8/2006 | Ono et al. .................. 345/167 |
| 2005/0248535 | A1 * | 11/2005 | Sawyer .................... 345/167 |
| 2006/0092136 | A1 * | 5/2006 | Nishimura et al. ....... 345/167 |
| 2006/0109248 | A1 * | 5/2006 | Su ........................... 345/167 |
| 2007/0091069 | A1 * | 4/2007 | Yang ........................ 345/167 |

FOREIGN PATENT DOCUMENTS

GB 2272763 * 11/1993

* cited by examiner

*Primary Examiner*—Albert K. Wong

(57) ABSTRACT

A laser locus ball apparatus for a wireless keyboard includes a base, a laser source generator, a locus ball, a light sensing element and a key cover. The base provides a lateral plate with a locating hole to locate the laser source generator and has another two opposite lateral plates with an engaging wedge at the bottom edge thereof to engage with the key cover. The top plate of the base has a supporting bore to receive the locus ball. A containing space is formed in the base to accommodate the optical sensing element. The laser source generator emits laser to the lower surface of the locus ball. The locus ball is movably received in and supported with the supporting bore such that the lower surface thereof extending downward from the supporting bore to reflect interference stripe figure during the lower surface of the locus ball receiving the laser. The light sensing element senses the laser interference stripe figure within every preset unit time. The key cover provides a circular hole at the top thereof for an upper surface of the locus ball extending outward the circular hole. Once the laser locus ball apparatus is in operation and the locus ball is moved, the moving direction and distance of the locus ball is figured out by the optical sensing element and position of the cursor of a screen is under control.

8 Claims, 4 Drawing Sheets

LASER LOCUS BALL APPARATUS FOR A WIRELESS KEYBOARD

BACKGROUND OF THE INVENTION

1. Field of the Invention

The present invention is related to a laser locus ball apparatus and particularly to a laser locus ball apparatus with laser optical module for reducing size thereof and enhancing resolution of sensed signal.

2. Brief Description of the Related Art

The conventional desktop and laptop computers usually provide a mouse or locus ball device to control the cursor on the screen thereof. The conventional mechanical mouse has two light gate wheels in the casing thereof and a locus ball movably connecting with the light wheels. A decoding circuit is provided to figure out signal change of light shooting to a light sensor for detecting moving orientation of the locus ball and controlling the cursor on the screen synchronously. However, the mechanical type mouse is designed complicatedly and controlled inaccurately. Moreover, the size of the mechanical type mouse is extremely large without meeting trend for smallness and lightness.

As for the conventional optical mouse, a light source is employed to shine the desktop and a light sensor captures and identifies signal changes of reflections from the desktop for figuring out and generating signals related to cursor movement. Although it is not necessary for the conventional optical mouse to have the locus ball rolling on the desktop, dusts and foreign substances can enter the mouse via the opening at the bottom of the casing to result in poor sensitivities or damages of the emitting light source and the receiving light source.

SUMMARY OF THE INVENTION

An object of the present invention is to provide a laser locus ball apparatus for a wireless keyboard, in which a reduced size of the locus ball and high resolution of laser sensing signal can be reached effectively due to the laser element therein having a size with smallness and lightness and the laser source having a single frequency with little power consumption and saving electrical energy.

In order to achieve the preceding object, the laser locus ball apparatus for a wireless keyboard according to the present invention includes a base, a laser source generator, a locus ball, an optical sensing element and a key cover. The base provides a lateral plate with a locating hole to locate the laser source generator and has another two opposite lateral plates with an engaging wedge at the bottom edges thereof to engage with the key cover. The top plate of the base has a supporting bore to receive the locus ball. A containing space is formed in the base to accommodate the optical sensing element. The laser source generator emits laser to the lower surface of the locus ball. The locus ball is movably received in and supported with the supporting bore such that the lower surface thereof extending downward from the supporting bore to reflect interference stripe figure during the lower surface of the locus ball receiving the laser. The optical sensing element senses the laser interference stripe figure within every preset unit time. The key cover provides a circular hole at the top thereof for an upper surface of the locus ball extending outward the circular hole. Once the laser locus ball apparatus is in operation and the locus ball is moved, the moving direction and distance of the locus ball is figured out by the optical sensing element and position of the cursor of a screen is under control.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
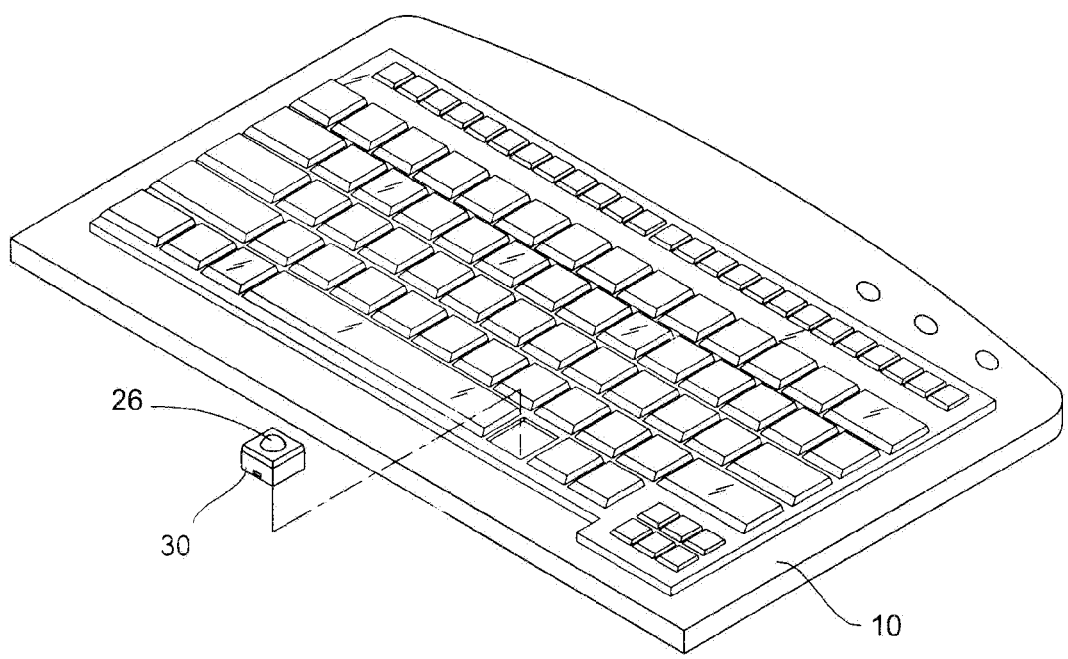
FIG. 1 is a perspective view of a preferred embodiment of a laser locus ball apparatus for a wireless keyboard according to the present invention.
Figure 2:
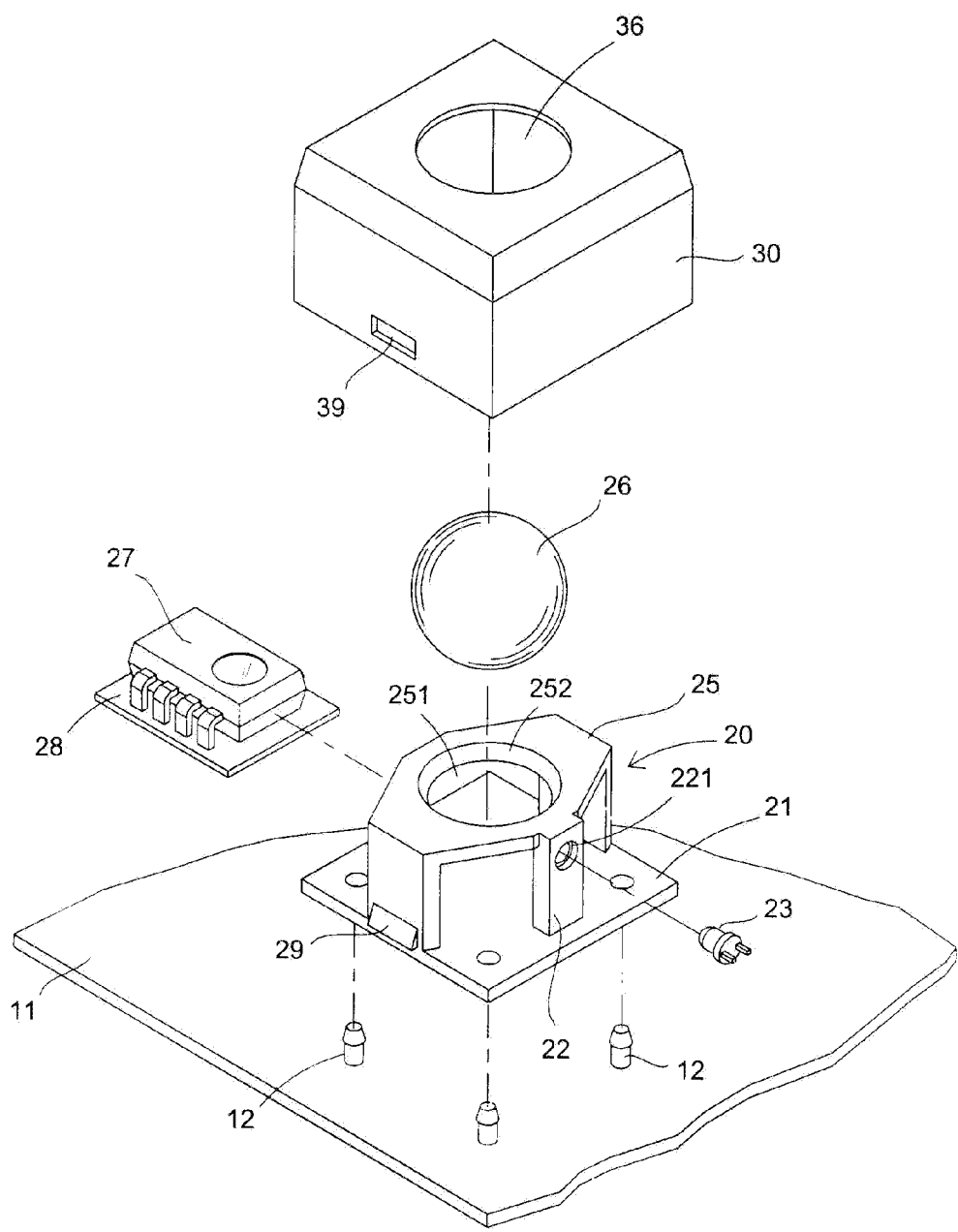
FIG. 2 is an exploded perspective view of the laser locus ball apparatus shown in FIG. 1.
Figure 3:
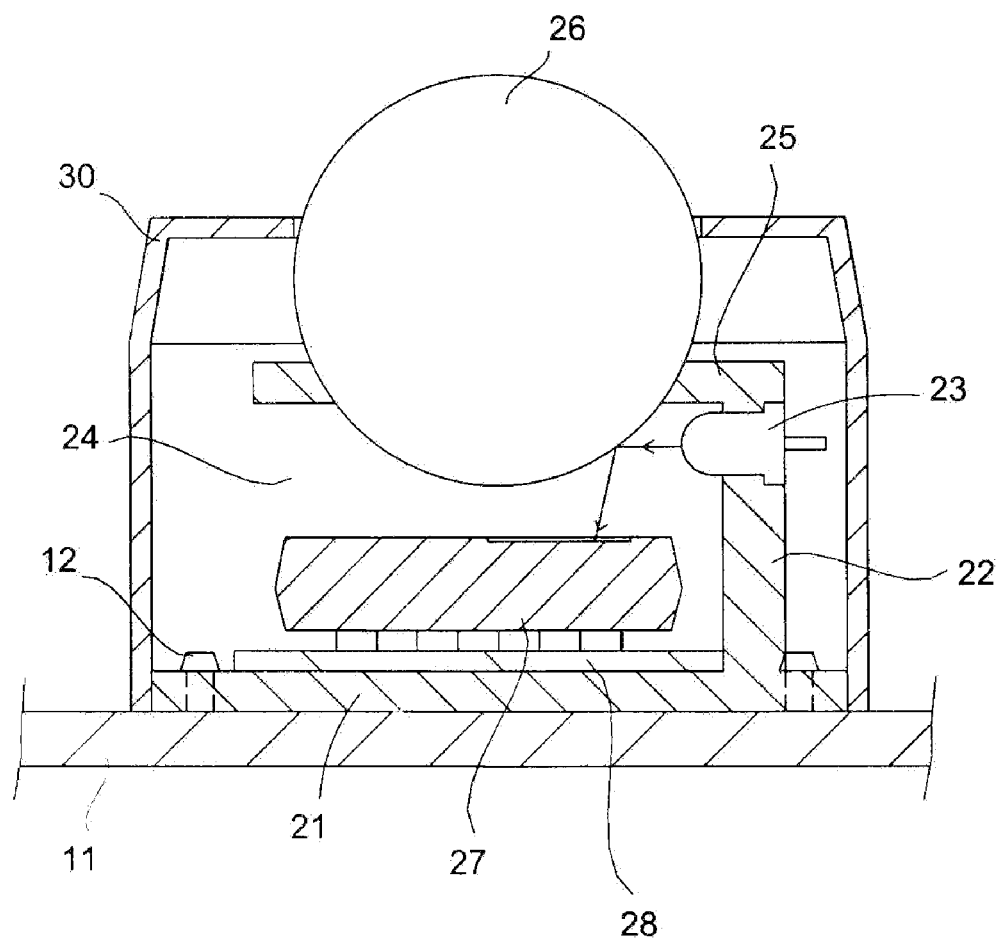
FIG. 3 is a sectional view of the laser locus ball apparatus shown in FIG. 1.

Referring to FIGS. 1 to 3, a laser locus ball apparatus for a wireless keyboard according to the present invention is mounted to a keyboard 10 on a substrate 11. The laser locus ball apparatus includes a base 20, a laser generator 23, a locus ball 26, an optical sensing element 27 and a key cover 30.

A laser emitting and sensing module is arranged in the base 20. The base 20 has a bottom plate 21 with a plurality of engaging holes for fitting with a plurality of engaging pins 12 provided on the substrate 11. A lateral plate 22 of the base 20 is pierced with a locating hole 221 for the laser generator 23 being disposed in the locating hole 221. The base 20 has a top plate 25 with a supporting bore 251 and the circumferential wall 252 of the supporting bore 251 has a curvature the same as that of the locus ball 26. Thus, the locus ball 26 is capable of being received in the supporting bore 251 and supported by the circumferential wall 252 precisely. A containing space 24 is provided between the top plate 25 and the bottom plate 21 for accommodating the light sensing element 27.

The laser generator 23 is a laser diode for generating semiconductor laser source and provides features such as small in size with light weight and little power consumption with saving electricity energy. The laser is a highly effective single color light source with single frequency. Once the laser emits toward the locus ball 26, an interference stripe figure is reflected from the locus ball 26 for the sensing element and a signal analysis circuit being able to figure out moving orientation of the locus ball 26 accurately.

The light sensing element 27 is attached to a circuit board 28 in the containing space 24 to capture and sense the laser stripe figure reflected from the lower surface of the locus ball 26 within every preset unit time. Further, the laser stripe figure is processed by the signal analysis circuit to figure out moving direction and distance of the locus ball 26 accurately so as to control the cursor on a computer monitor synchronously.

The key cover 30 is fixedly attached to the periphery of the base 20 to cover the base 20 completely. A circular hole 36 is provided at the top of the key cover 30 and the upper surface of the locus ball 26 extends outward the circular hole 26 such that the locus ball 26 can be stirred by a finger of a user for adjusting the position of the cursor on the screen. Further, two opposite lateral sides of the key cover 30 provides an engaging slot 39 near the bottom edges thereof respectively corresponding to an engaging wedge 29 disposed at bottoms of another two opposite lateral plates of the base 20 for securing the key cover 30 to the base 20 firmly.

Figure 4:
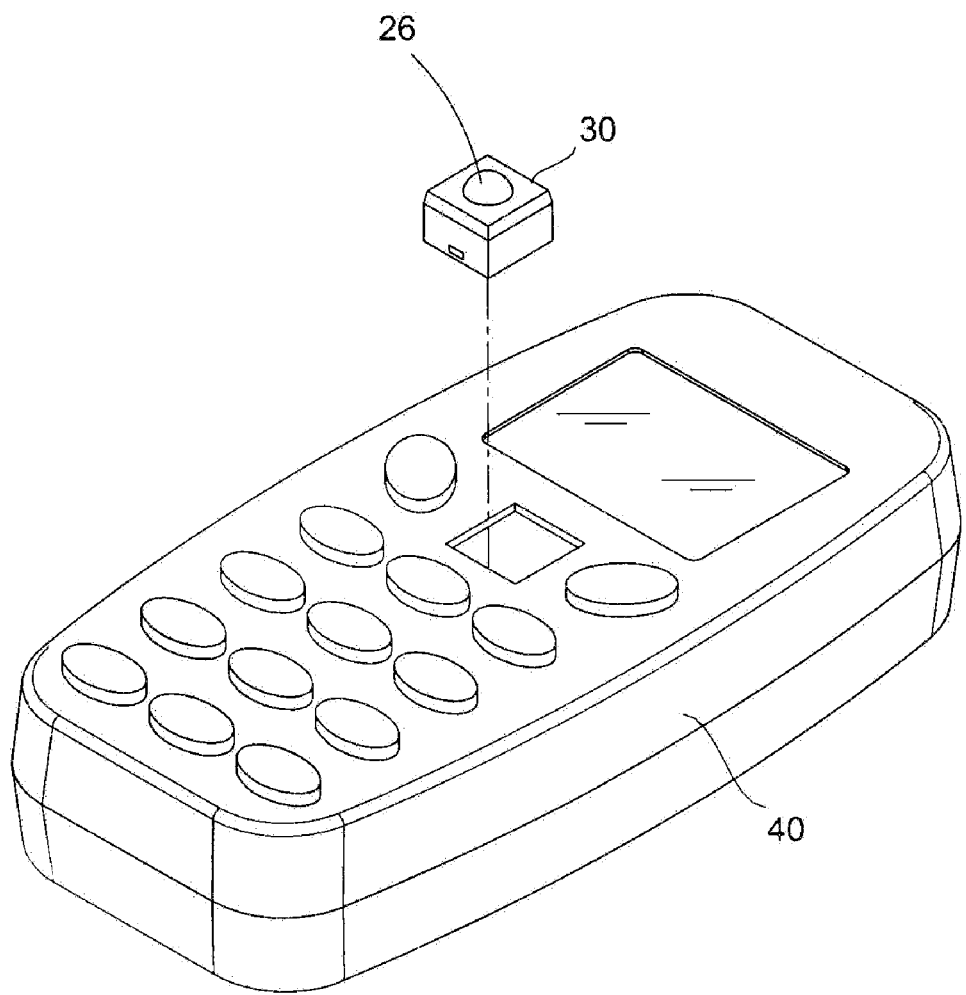
FIG. 4 is a perspective view of another embodiment of a laser locus ball apparatus according to the present invention.

Referring to FIG. 4, another embodiment of the laser locus ball apparatus according to the present invention is illustrated and the laser locus ball apparatus is mounted to the substrate of the keyboard on a cell phone set 40. The key cover 30 and the locus ball 26 are reduced sizes thereof for being suitable for the cell phone set 40. In order to implement the present embodiment, the locus ball 26 provides a diameter slightly less than 5 mm and the locus bass 26 is able to be operated to control the cursor on the screen on the keyboard of the cell phone set 40 accurately by means of signal being sensed by the laser optical module.

As the foregoing, it is appreciated that a laser locus ball apparatus for a wireless keyboard according to the present invention has the following advantages:

A delicate semiconductor laser optical module is applied to capture and sense the reflected laser interference stripe signal from the surface of the rolling locus ball 26 with the optical sensing element 27 for obtaining high resolution of the sensed signal.

The laser element provides smallness and lightness with little power consumption and electrical energy saving.

The laser locus ball apparatus is integrally arranged in the key cover 30 and the base 20 to simplify the entire structure thereof for being set up easily and being operated precisely.

While the invention has been described with referencing to preferred embodiments thereof, it is to be understood that modifications or variations may be easily made without departing from the spirit of this invention, which is defined by the appended claims.

What is claimed is:

1. A laser locus ball apparatus for a keyboard, comprising:
   a base for containing a space formed therein, wherein the base includes: a top plate with a supporting bore, a first lateral plate depending downward from the top plate and having a locating hole, and two opposite second lateral plates each with an engaging wedge at the bottom wherein the second lateral plates depend downward from the top plate;
   a laser source generator disposed in the locating hole;
   a locus ball with an interference strip figure on its surface wherein the ball is moveably received in and supported by the supporting bore such that the lower surface of the ball extends downward from the supporting bore to reflect the light emitted by the laser;
   a light sensing element disposed in the space formed by the base to capture the light reflected by the ball and to generate a control signal to indicate the movement of the ball; and
   a key cover with a shape to cover the base completely and having a circular hole at the top to permit the upper surface of the ball to extend outward through the circular hole wherein the cover is secured to the base via the wedges.

2. The laser locus ball apparatus for a keyboard as defined in claim 1, wherein the base has a bottom plate with a plurality of engaging holes to fit with a plurality of engaging pins on a substrate of the keyboard.

3. The laser locus ball apparatus as defined in claim 1, wherein the circumferential wall surface of the supporting bore has the same curvature as the locus ball.

4. The laser locus ball apparatus as defined in claim 1, wherein the laser source generator is a semiconductor laser diode that produces a light source with a single color and frequency.

5. The laser locus ball apparatus as defined in claim 1, wherein the diameter of the locus ball is approximately 5 mm.

6. The laser locus ball apparatus as defined in claim 1, wherein the key cover includes two engaging slots near the lower edge of two opposite sides to engage with the wedges of the base for joining the cover with the base.

7. The laser locus ball apparatus for a keyboard as defined in claim 1, wherein the wireless keyboard is for a computer.

8. The laser locus ball apparatus for a keyboard as defined in claim 1, wherein the keyboard is for a cell phone.

* * * * *